No. 798,827. PATENTED SEPT. 5, 1905.
P. PIRSCH.
COMBINED HOSE SHUT-OFF AND DOOR OPENER.
APPLICATION FILED JUNE 17, 1904.
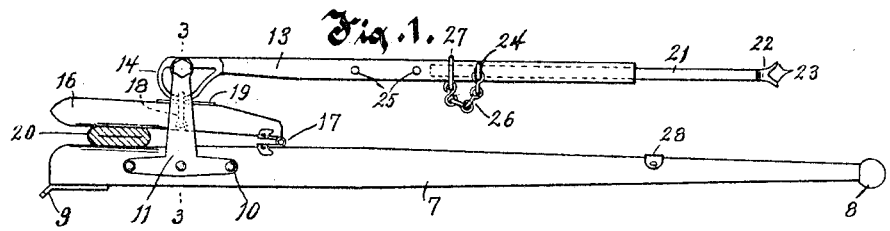
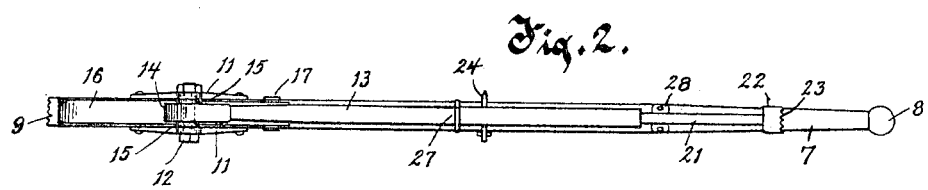
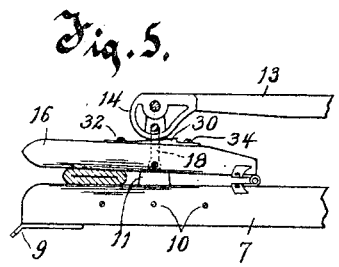
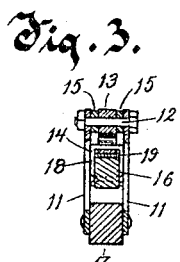
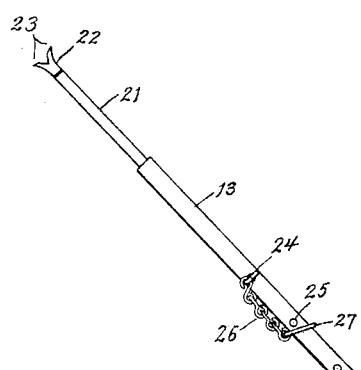
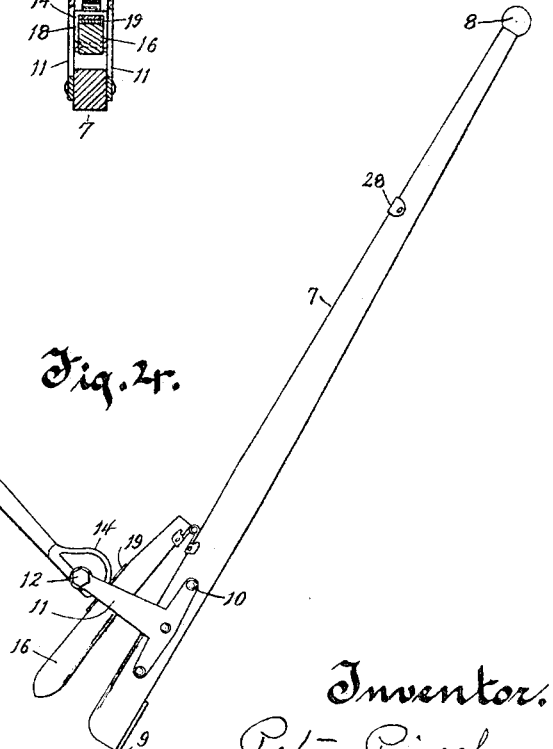
Witnesses.
C. H. Keeney.
R. S. Caldwell.
Inventor.
Peter Pirsch
By Benedict & Morsell
Attorneys.

UNITED STATES PATENT OFFICE.

PETER PIRSCH, OF KENOSHA, WISCONSIN.

COMBINED HOSE SHUT-OFF AND DOOR-OPENER.

No. 798,827.        Specification of Letters Patent.        Patented Sept. 5, 1905.

Application filed June 17, 1904. Serial No. 213,008.

*To all whom it may concern:*

Be it known that I, PETER PIRSCH, residing in Kenosha, in the county of Kenosha and State of Wisconsin, have invented new and useful Improvements in a Combined Hose Shut-Off and Door-Opener, of which the following is a description, reference being had to the accompanying drawings, which are a part of this specification.

My invention relates to combined hose shut-offs and door-openers, and has for its object to provide an implement for firemen's use which will have the double function of being capable of readily shutting off the flow of water through a broken or disconnected fire-hose and also serving as a ready and efficient means for forcing open a door.

With the above and other objects in view the invention consists in the devices and parts and their equivalents, as hereinafter set forth.

Referring to the accompanying drawings, in which like characters of reference indicate the same parts in the several views, Figure 1 is a side elevation of a combination hose shut-off and door-opener embodying the principles of this invention and shown as in the act of shutting off a fire-hose. Fig. 2 is a plan view thereof. Fig. 3 is a sectional view taken on the line 3 3 of Fig. 1. Fig. 4 is a side elevation of the same device, shown as in the operation of forcing open a door. Fig. 5 is an elevation, with parts removed, of a similar device employing a modified form of bearing-plate; and Fig. 6 is a plan view of such modified form of bearing-plate.

In the views, 7 represents a main lever or member, which is provided at one end with a rounded handle 8 and at its other end has an angular non-slipping plate 9 extending beyond the lever 7, with serrations in its end to constitute a fulcrum for the lever during the door-forcing operation, which will be proof against slipping.

Near the fulcrum end of the operating-lever 7 are secured on opposite sides thereof, by bolts or rivets 10 or other securing means, a pair of T-shaped brackets 11, which have their projecting ends connected by a pivotal bolt 12. A tubular cam-lever 13, of metal, has at one end a cam-loop 14 and is pivotally mounted on the bolt 12 with spacing-washers 15 between it and the brackets 11, said cam-loop 14 being concentric with the bolt 12 at one portion thereof and eccentric thereto at another portion. A jaw member 16 is pivoted to the main lever 7 by a hinge-like connection 17 and extends between the brackets 11, with a bail-link 18 pivoted thereto and passing through the cam-loop 14 of the cam-lever 13. A bearing-plate 19 is secured to the upper surface of the jaw member 16, beneath the bail-link 18, to form a bearing-surface for the cam 14.

From the foregoing it will be seen that when the cam-lever 13 is raised from the position shown in Fig. 1, where the cam 14 is in engagement with the jaw member 16 at the point thereof farthest from the pivotal bolt 12, which is the concentric portion, the cam 14 will ride through the bail-link 18, and as the eccentric portion thereof passes through said bail-link it lifts the jaw member 16, causing it to swing upon the hinge 17 to release the fire-hose 20, which is shown in said figure as being closed in the jaw between the jaw member and the main lever 7. This opening of the jaw member 16 is a positive operation due to the engagement of the bail-link 18 with the inner surface of the cam-loop 14. The closing operation of the jaw member 16 is accomplished by swinging the cam-lever 13 downwardly, and thereby causing the cam-loop 14 to press against the bearing-plate 19 with its eccentric exterior cam-surface, and so force the jaw member 16 to swing upon its hinge connection 17 toward the main lever 7 and tightly clamp the fire-hose 20 therebetween. The under side of the jaw member 16 and the upper side of the main lever 7, where they coact to produce the clamping operation upon the fire-hose, are rounded to prevent cutting the hose, and their extreme ends are also rounded to permit of freely passing the hose into the open-mouthed jaw formed thereby.

It is obvious that when the cam-lever 13 has been swung sufficiently far to complete the shut off of the hose by the effect of its cam 14 on the jaw member 16 the said cam has reached its concentric portion in bearing upon the bearing-plate 19, and therefore the device may be left without fear of the water-pressure in the hose forcing it open, since the pressure of the bearing-surface 19 against the cam 14 will then have no tendency to raise the cam-lever 13.

This implement is adapted to serve the additional purpose of a door-opener by having slidably fitting within the tubular part of cam-lever 13 a claw-bar 21, which is provided on its outer end with a head 22, having diverging sets of claw-teeth 23. The bar 21 is adjustably secured within the tube of the cam-lever 13 by means of a pin 24, adapted to pass through one of a series of pairs of registering perforations 25 in the sides of the tubular cam-lever 13 and through an opening in the claw-bar 21, registering therewith, said pin being attached to the cam-lever 13 by a chain connection 26 with a ring 27, slidable on the said cam-lever. By this means the claw-rod 21 may be extended more or less from the tubular cam-lever 13 and locked in its extended position, and when the device is arranged as shown in Fig. 4, with the non-slipping plate 9 bearing with its teeth upon the floor and constituting a fulcrum for the main lever 7 and the head 22 of the draw-bar 21 has its claw-teeth 23 bearing against the door to be opened, a movement of the main lever 7 toward the door will force the claw-lever 21 to press inwardly and upwardly on the door, and the great leverage obtained by the relative location of the pivotal pin 12 makes it possible to apply sufficient force against the door to compel it to yield or break from its connections.

It will be noted that the forward movement of the main lever 7 or the movement toward the door being operated upon is effective as long as the pivotal pin 12 remains above the line between the plate 9, the fulcrum of main lever 7, and the point of engagement of the claw-teeth 23 with the door; but should a rearward or upward movement of the operating-lever 7 be more available or desirable for any reason the door-forcing operation may be equally well accomplished by arranging the parts so that the pivotal pin 12 lies below the said line between the fulcrum of the main lever 7 and the engaging point of the claw-teeth 23 with the door. In either case the forcing of the door will continue until the said pivotal pin 12 reaches such line, when if the forcing of the door has not been completed a new hold may be taken either by the non-slipping plate 9 with the floor or the claw-teeth 23 with the door, and the operation is repeated as before. The claw-bar 21 is normally secured in its innermost position by the pin 24, and the main lever 7 is provided with a wearing-plate 28 at the point where the claw-teeth 23 will strike thereagainst, so as to prevent the scratching of said main lever 7 by the claw-teeth. The claw-teeth 23 on the head 22 of the claw-bar 21 are arranged in duplicate, so that one or the other thereof will be in operative relation, even though the claw-bar 21 should be given a half-turn during the adjustment thereof, and thus obviate the difficulty of having the teeth bent the wrong way, as would result under similar circumstances if but one series of these teeth were provided. It will further be noted that the compound lever produced by the cam-lever 13 and the jaw 16 has great power because of the great leverage thereof and the slow action of the cam 14, and consequently the necessary force may be applied for overcoming the pressure of the water in the fire-hose, and, further, the arrangement is such that there is no tension given to the hinge connection 17 of the jaw member during the hose-shutting-off operation.

A slight modification of the device above described is shown in Figs. 5 and 6, in which the bearing-plate 19 is replaced by a bearing-plate 30, provided with an inclined upper surface and having an adjustment on the jaw member 16 by means of a longitudinal slot 31, at one end thereof, adapted to slide on the screw 32, which passes through said slot into the jaw member 16, and also by means of the series of perforations 33 at the other end of said bearing-plate, through any one of which a screw 34 is adapted to pass to bind the bearing-plate to the jaw member 16. This adjustment is provided in order that the distance between the jaw member 16 and the jaw of the main lever 7, when the concentric portion of the cam 14 is bearing on the bearing-plate, may be varied, so that hose of different thickness may be effectively clamped thereby to entirely shut off the flow of water therethrough. When it is found that at a given position of the bearing-plate 30 the jaws will not completely shut off the hose, owing to the fact that said hose is not as heavy as the standard fire-hose—as, for instance, with a mill-hose—it is only necessary to remove screw 34, loosen screw 32, and slide the bearing-plate 30 along the jaw member 16 so that it will bear against the cam 14 higher up on its inclined surface, then replace the screw 34 through another opening 33 and tighten screw 32. The degree of play allowed the cam 14 within the bail-link 18 is sufficient to permit the bearing-plate 30 to be moved until its highest point is in engagement with the cam 14 without binding the cam against said bail-link.

What I claim as my invention is—

1. In a device of the character described, a main member, a pair of brackets secured thereto, a jaw member pivoted to the main member and extending between the brackets, a cam-lever pivoted to the brackets and having a cam-loop thereon, and a bail-link secured to the jaw member and passing through the cam-loop of the cam-lever.

2. In a device of the character described, a main member, a pair of brackets secured thereto, a jaw member pivoted to the main member and extending between the brackets, a cam-lever pivoted to the brackets and having a cam-loop with an eccentric portion and a concentric portion, and a bail-link pivoted to the jaw member and passing into the cam-loop of the cam-lever.

3. In a device of the character described, a main member, a pair of brackets secured thereto, a jaw member pivoted to the main member and extending between the brackets and forming with the end of the main member a rounded open-mouthed jaw, a cam-lever pivoted to the brackets and having a cam-loop bearing on the jaw member, and a bail-link pivoted to the jaw member and passing through the cam-loop of the cam-lever, said cam having a concentric portion and an eccentric portion.

4. In a device of the character described, a main lever, a pair of brackets secured thereto, a jaw member pivoted to the main lever and extending between the brackets, a cam-lever pivoted to the brackets and bearing on the jaw member and adapted to force said jaw member toward the main lever and constituting a hose shut-off, and a claw on the cam-lever adapted to engage a door and serving as a door-opener when the main lever is swung upon one end as a fulcrum.

5. In a device of the character described, a main lever having a non-slipping plate at one end, a pair of brackets secured to the main lever near said end, a jaw member pivoted to the main lever and extending between the brackets, and a cam-lever pivoted to the brackets and adapted to press the jaw member toward the main lever to constitute a hose shut-off, said cam-lever being provided with claw-teeth to engage a door, whereby the device may be operated as a door-opener when the main lever is swung upon the non-slipping plate as a fulcrum.

6. In a device of the character described, a main lever, a pair of brackets secured thereto, a jaw member pivoted to the main lever and extending between the brackets, a tubular cam-lever pivoted to the brackets and adapted to press the jaw member toward the main lever to constitute a hose shut-off, a claw-bar slidable in the tubular end of the cam-lever and having means for securing it in its adjustments, said claw-bar having teeth for engaging a door, whereby the device may be operated as a door-opener when the main lever is swung upon one end as a fulcrum.

7. In a device of the character described, a main lever, a toothed non-slipping plate secured to one end thereof, a pair of brackets secured to the main lever, a jaw member pivoted to the main lever and extending between the brackets, a cam-lever pivoted to the brackets and adapted to press the jaw member toward the main lever to constitute a hose shut-off, said cam-lever being provided with a tubular end, a claw-bar slidable in the tubular end of the cam-lever, and a pin adapted to lock the claw-bar in its several positions in the tubular end of the cam-lever by passing through registering openings therein, said claw-bar having teeth for engaging a door whereby the device may be operated as a door-opener when the main lever is swung upon the non-slipping plate as a fulcrum.

8. In a device of the character described, a main member, a jaw member pivoted thereto, brackets on the main member, a cam-lever pivoted to the brackets, and an adjustable bearing-plate on the jaw member adapted to be engaged by the cam of the cam-lever.

9. In a device of the character described, a main member, a pair of brackets secured thereto, a jaw member pivoted to the main member and extending between the brackets, a cam-lever pivoted to the brackets, and a bearing-plate having an inclined surface adjustably mounted on the jaw member and adapted to engage the cam of the cam-lever.

10. In a device of the character described, a main member, a pair of brackets secured thereto, a jaw member pivoted to the main member and extending between the brackets, a cam-lever pivoted to the brackets and having a cam-loop, an adjustable bearing-plate mounted on the jaw member and having an inclined bearing-surface adapted to be engaged by the cam-loop, and a bail-link pivoted to the jaw member and passing into the cam-loop of the cam-lever.

11. In a device of the character described, a main member, a pair of brackets secured thereto, a jaw member pivoted to the main member and extending between the brackets, a cam-lever pivoted to the brackets, and a bearing-plate having an inclined bearing-surface to be engaged by the cam of the cam-lever adjustably mounted upon the jaw member by having a longitudinal slot in one end adapted to ride on a securing-screw therefor and a series of perforations on the other end adapted to receive a securing-screw in the several adjustments of the bearing-plate.

12. In a device of the character described, a main member, a pair of brackets secured thereto, a jaw member pivoted to the main member and extending between the brackets, a cam-lever pivoted to the brackets and having a cam-loop thereon, and an engaging means secured to the jaw member and passing into the cam-loop of the cam-lever.

13. In a device of the character described, a pair of brackets secured thereto, a jaw member pivoted to the main member and extending between the brackets, a cam-lever pivoted to the brackets and having a cam-loop with an eccentric portion and a concentric portion, and an engaging means pivoted to the jaw member and passing into the cam-loop of the cam-lever.

In testimony whereof I affix my signature in presence of two witnesses.

PETER PIRSCH.

Witnesses:
CALVIN STEWART,
W. F. HALLFRISCH.